May 3, 1966

D. B. STEPHENS ETAL 3,249,751

VEHICLE LAMP

Filed Feb. 4, 1964

INVENTORS
David B. Stephens
BY & Loell W. Good

Peter P. Kozak
ATTORNEY

United States Patent Office 3,249,751
Patented May 3, 1966

3,249,751
VEHICLE LAMP
David B. Stephens and Loell W. Good, Anderson, Ind., assignors to General Motors Corporation, Detroit, Mich., a corporation of Delaware
Filed Feb. 4, 1964, Ser. No. 342,417
4 Claims. (Cl. 240—41.55)

This invention relates to lamps and more particularly to a vehicle lamp having novel breathing closure means including means for draining water therefrom.

This invention is particularly concerned with gasket sealed lighting equipment for automobiles. Modern automobile building practice has resulted in the design of lamps of many complicated and varying shapes for use as taillights, parking lights, etc. The complex shape of the lens typically used for these purposes and the fact that such shapes may be changed annually makes it prohibitive to manufacture such lamps in a fully sealed manner as is customary with the headlights of a vehicle. Moreover, since lamps such as taillights are located near the rear wheels of the automobile, water and other deleterious materials such as road dust and road salts tend to be splashed upwardly against such lamps. It is desirable therefore to provide a lamp structure which will permit the drainage of any condensate which may occur within the lamp casing and which will prevent the ingress of deleterious substances such a water, dust, road salts and the like.

It is, therefore, the basic object of this invention to provide a vehicle lamp having simple and inexpensive means for permitting water drainage from the lamp and for preventing the ingress of deleterious substances such as water, dust, road salts and the like into the lamp. It is a further object of this invention to provide gasket means for sealing the lens and the lamp casing in the form of a one-piece gasket including drainage and air breathing means which may be efficiently and economically manufactured and efficiently installed in the lamp unit during the assembly thereof.

These and other objects of the invention are accomplished by the provision of a flat elastic endless gasket member made of a rubber-like material and having the oppositely disposed flat sides constitute sealing surfaces adapted to sealingly engage the casing and the lens of the lamp unit respectively. The gasket member is provided with a cutout or notch therethrough which extends transversally across the gasket member and the sealing surfaces of the gasket. The portions of the gasket member adjacent the notch are connected by a bridge segment of the elastic rubber-like or elastomeric material which extend inwardly of the sealing surfaces of the gasket. A plug of moisture absorbent resilient material is provided within the notch so as to substantially fill the notch portion and have an end thereof imbedded within the bridge segment of the gasket member whereby a one-piece gasket member is formed. When assembled in the lamp unit in position to seal the lamp casing with respect to the lens, the rim of the lens and the lamp casing sealingly and compressibly engage the gasket and the plug. As a consequence the elastomeric portions of the gasket and the plug are compressed whereby the elastomeric material of the gasket member adjacent the plug is distorted into sealing contact with the plug to provide an efficient air breathing seal capable of draining water from the lamp casing. The plug member extends from a point outside of the outer rim of the lens to a point within the lamp to provide a moisture absorbent, air permeable path capable of permitting the passage of air therethrough, of permitting the drainage of condensation water from the lamp, and preventing the ingress of water, dust and the like into the lamp. To facilitate the drainage of water from the lamp casing, the plug portion of the gasket member is located in a lowermost position.

Further objects and advantages of the invention will be apparent from the following description, reference being had to the accompanying drawing wherein a preferred form of the present invention is clearly shown.

Figure 1:
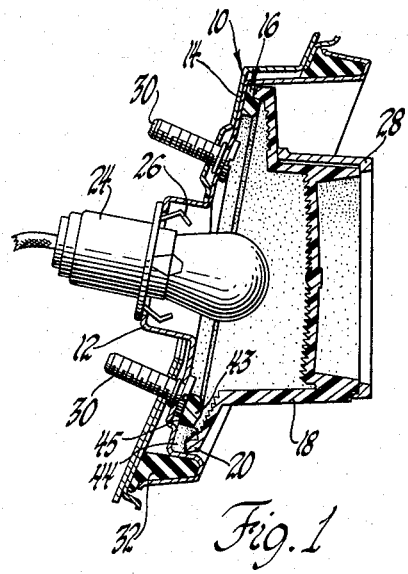
FIGURE 1 is a cross-sectional view of a lamp assembly embodying this invention.
Figure 2:
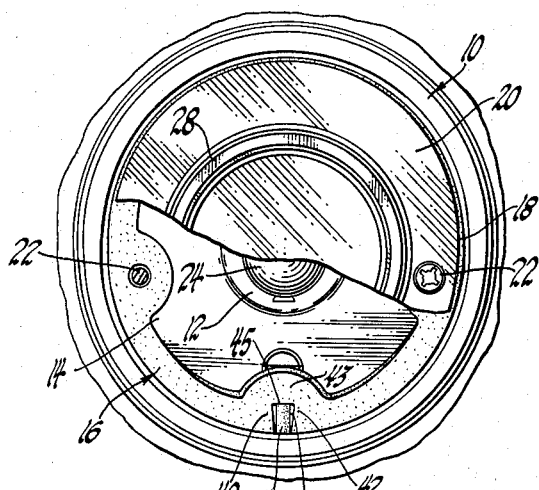
FIGURE 2 is a front view in partial cross-section of FIGURE 1.

The invention will now be described in detail with reference to the drawings. There is shown in FIGURES 1 and 2 a vehicle lamp unit 10 of the type commonly used on automobiles which is generally located in an area immediately adjacent the rear wheels and/or gravel pan of the vehicle. The lamp 10 comprises a generally cup-shaped casing 12 having an outwardly extending flange 14 on which there is positioned the gasket member 16 formed of an elastomeric or rubber-like material such as natural rubber, butadiene-styrene copolymers, butadiene-acrylonitrile copolymers, polychloroprene, foamed material of these natural and synthetic rubbers, polyvinyl chloride foams, polyurethane foams, and the like which are generally known to be suitable for sealing purposes. A lens element 18 preferably having a rim 20 is positioned over the open face of the lens casing 12 with the inner peripheral surface of the rim 20 compressibly contacting the gasket 16, whereby the lens is sealed with respect to the lamp casing.

As shown in FIGURE 2, the lens element 18 is secured snugly to the lamp casing by means of the screws 22 passing through the lens element 18 and the gasket 14 and being screwed into threaded openings in the casing 12 (not shown). A lamp bulb and socket 24 as a source of illumination is positioned within the casing 12 and is retained therein, preferably by means of the spring retainer member 26. In the embodiment shown in FIGURES 1 and 2 the lens 18 is provided with an annular decorative rim 28 and the lamp is maintained on the car body by means of the bolts 30 and the elastomeric shock absorbing ring 32.

Lamps of the type shown in the drawings, as previously indicated, are frequently subject to impact by water, road dust, and road salts under normal operating conditions. The presence of dust and moisture in the lamp structure is particularly deleterious with present high-speed automobiles because they tend to diminish the light emitted by the lamp. Condensation tends to take place within the lamp in the presence of dust to form a fog therein. The moisture tends to condense on the lens and other surfaces of the enclosure to adversely effect the projection of a light beam. The dust, road salts and moisture result in corrosion and other damage to the lamp reflector and other lamp components.

Figure 3:
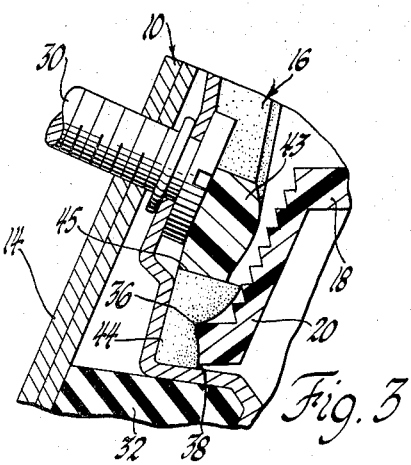
FIGURE 3 is an enlarged fragmentary view in cross-section of the lower portion of the lamp assembly shown in FIGURE 1 showing the vent and drain plug in greater detail.

In accordance with this invention there is provided a means associated with the gasket for permitting air to pass to and from the interior of the lamp for permitting moisture condensed within the lamp to drain out and for preventing the ingress of moisture, dust and the like into the lamp. As may be seen in FIGURES 2 and 4, to this end the gasket 16 is provided with a notch 34, which when positioned in the lamp unit as shown in FIGURES 1 and 3, extends from a point 36 within the lamp space between the casing 12 and the lens element 18 and the interior edge of the rim 20 to a point 38 at the outer edge of the lens element 18 which is exposed to the atmosphere. The portions of the gasket 40 and 42 adjacent the notch 34 are joined by means of the bridge segment 43 integrally formed therewith extending inwardly of the sealing portions of the gasket 16. A plug 44 of moisture absorbent material is disposed within the notch 34 to substantially fill the notch and has its inner end 45 imbedded in the bridge segment 43 whereby an integral gasket unit is formed. The plug 44 may be formed of any suitable moisture absorbent material such as wadded cotton.

As shown in FIGURE 3, the gasket 16 is compressibly interposed between the rim 20 of the lens element and the flange 14 of the lamp casing. The elastomeric portions of the gasket as well as the plug 44 are compressed whereby any space between the plug and the gasket material is filled with the gasket material due to the latter's deformation. It will be readily apparent that the notch 34 and accordingly the plug 44 are in communication with the interior of the lamp as well as the atmosphere to provide means whereby the air breathes in and out of the lamp and means whereby moisture within a lamp may drain therefrom and whereby any ingress of moisture, dust and the like is effectively prevented. As shown in FIGURE 1, the plug portion of the gasket is in a lowermost position to permit efficient drainage. Preferably the lamp casing is provided with a second flange portion which shields the plug 44 from direct contact with splashed water.

Figure 5:
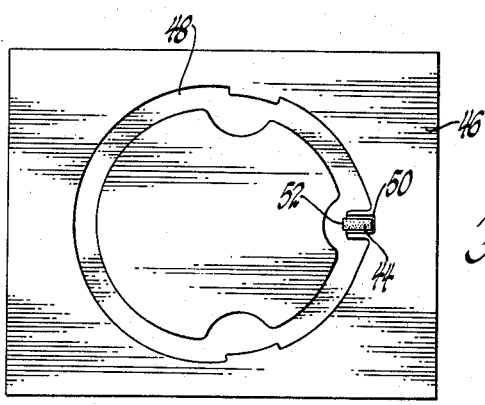
FIGURE 5 is a mold which may be used to manufacture the gasket of this invention.

Preferably the gasket member 16 of this invention is made of a foamable vinyl plastisol by means such as the mold 46 shown in FIGURE 5. A suitable foamable vinyl plastisol for use in making the gasket member may consist of about 100 parts of a plastisol grade polyvinyl chloride, 80 to 125 parts of a suitable plasticizer, preferably 3 to 5 parts of a stabilizer and 1 to 8 parts of a blowing agent such as N,N'-dinitroso-N,N'-dimethyl terephthalamide. Suitable vinyl resin components such as polyvinyl chloride-acetate copolymers and vinyl chloride-diethyl maleate copolymers may be used in this formulation. Plasticizers such as tricresyl phosphate, di-2-ethylhexyl phthalate, dioctyl phthalate, dioctyl adipate, dioctyl sebacate and mixtures of these plasticizers may be used. Stabilizers such as dibasic lead phosphite and the epoxy resin stabilizer Ferro 900, manufactured by the Ferro Corporation, may be used. Vinyl resin plastisol compositions such as are disclosed in the United States Patent No. 3,030,394, Barnhizer et al. are particularly useful for making the gasket elements of this invention.

A specific suitable vinyl plastisol formulation may consist of 100 parts polyvinyl chloride, 100 parts tricresyl phosphate, 5 parts dibasic lead phosphite and 3 parts of the N,N'-dinitroso-N,N'-dimethyl terephthalamide blowing agent.

Figure 4:
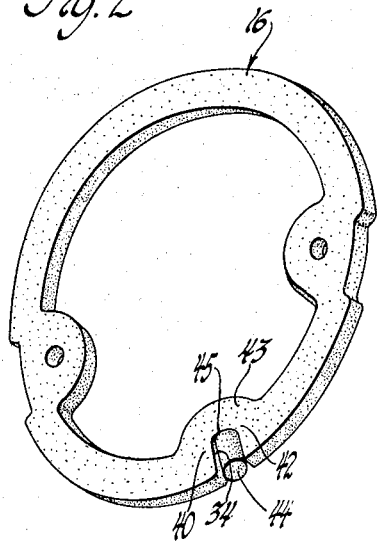
FIGURE 4 is a perspective view of the gasket of this invention.

The space 48 of the mold shown in FIGURE 5 represents a cavity having the shape of the gasket to be made as is shown in FIGURE 4. The mold further includes the cavity 50 having the configuration of the plug 44 which communicates with the cavity 48. In manufacturing the gasket the fibrous moisture absorbent plug 44 is inserted in the cavity portion 50 as shown whereby the end 52 thereof extends somewhat into the cavity 48. A metered quantity of the plastisol is poured into the mold cavity 48 in the form of a uniform layer. The quantity of the plastisol poured into the mold cavity is previously determined to be sufficient to completely fill it on expanding. A cover plate (not shown) may be placed over the mold cavity although this is not essential. The mold is placed into an oven maintained at about 350° F. After a few minutes the mold is removed from the oven. In the heating step the blowing agent decomposes as the temperature of the plastisol passes through the decomposition range thereof which is in the neighborhood of 170° F. to 175° F. The gases resulting from the decomposition of the blowing agent expands the plastisol whereby it completely fills the mold cavity and envelops the end 52 of the plug 44. At the temperature of 350° F. the plastisol fuses. The resulting gasket has a uniform density and fine cell consistency and a desired elasticity for gasket purposes.

It will be understood by those skilled in the art that other materials suitable for gasket purposes previously mentioned may be used to make gaskets by appropriate procedures for the various materials used.

While the embodiment of the present invention as herein disclosed constitutes a preferred form, it is to be understood that other forms may be adopted as defined by the scope of the claims which follow.

We claim:

1. A vehicle lamp comprising a casing, a flange formed on said casing, a sealing gasket on said flange, a lens having a rim compressibly positioned on said gasket, said gasket having an elongated notch completely through the thickness of its lowermost portion and extending from the inner edge of said rim to a point adjacent the outer edge of said rim providing a passage through said gasket interconnecting the interior of said casing with the atmosphere, and a plug of absorbent compressible material within the said notch extending across said rim and having its innermost end imbedded in said gasket.

2. In a vehicle lamp comprising a casing, a flange formed on said casing, a sealing gasket on said flange, a lens having a rim compressibly positioned on said gasket, the improvement comprising said gasket being provided with an elongated notch completely through the thickness of its lowermost portion and extending from the inner edge of said rim to a point adjacent the outer edge of said rim providing a passage through said gasket interconnecting the interior of said casing with the atmosphere, and a plug of absorbent compressible material within said notch extending across said rim and having its innermost end imbedded in said gasket.

3. A vehicle lamp comprising a casing, a flange formed on said casing, a sealing gasket on said flange, a lens having a rim compressibly positioned on said gasket, said gasket having an elongated notch completely through the thickness of its lowermost portion and extending from the inner edge of said rim to a point adjacent the outer edge of said rim providing a passage through said gasket interconnecting the interior of said casing with the atmosphere and a plug of absorbent compressible material substantially filling said notch and extending across said rim and having its innermost end imbedded in said gasket, said gasket and said plug being compressed between said casing and said rim whereby the space between said plug and said gasket between the said inner and outer edges of said rim are eliminated.

4. A gasket for sealing the casing and the lens element in a lamp assembly comprising an elastic rubber-like endless member having oppositely disposed sealing surfaces adapted to sealingly engage said casing and said lens respectively, said member having a notch therethrough extending transversely across said member and said surfaces, said member including an integrally formed bridge portion positioned inwardly of said surfaces connecting the portions of said member on either side of said notch and a plug of absorbent compressible material substantially filling said notch having an end portion imbedded in and supported by said bridge portion.

References Cited by the Examiner

UNITED STATES PATENTS

| | | | |
|---|---|---|---|
| 2,543,226 | 2/1951 | Briggs | 240—8.2 X |
| 2,814,720 | 11/1957 | Martin | 240—41.55 |
| 2,925,487 | 2/1960 | Beach | 240—8.3 |
| 3,004,146 | 10/1961 | Martin et al. | 240—41.55 |
| 3,020,394 | 2/1962 | Barnhizer et al. | 240—8.3 X |
| 3,032,644 | 5/1962 | McGrew | 240—41.55 X |

NORTON ANSHER, *Primary Examiner.*